United States Patent [19]

Akiyama

[11] Patent Number: 4,792,857
[45] Date of Patent: Dec. 20, 1988

[54] LIQUID CRYSTAL TELEVISION

[75] Inventor: Ryoichi Akiyama, Kawasaki, Japan

[73] Assignee: Stanley Electric Co., Ltd., Tokyo, Japan

[21] Appl. No.: 161,162

[22] Filed: Feb. 26, 1988

[30] Foreign Application Priority Data

Dec. 4, 1987 [JP] Japan .................. 62-305541

[51] Int. Cl.⁴ ............................. H04N 5/70
[52] U.S. Cl. .................. 358/236; 340/784; 340/814
[58] Field of Search .......... 358/59, 236, 241; 340/784, 811, 814

[56] References Cited

U.S. PATENT DOCUMENTS 4,591,902  3/1986  Masubuchi .................. 358/236
4,635,127  1/1987  Togashi ..................... 358/236

FOREIGN PATENT DOCUMENTS 48433  4/1979  Japan .................. 358/236
28671  2/1980  Japan .................. 358/236
24187  2/1982  Japan .................. 358/59
24186  2/1982  Japan .................. 358/59

Primary Examiner—Tommy P. Chin
Attorney, Agent, or Firm—Louis E. Marn

[57] ABSTRACT

A liquid crystal television comprises providing two multivibrators different in time constant with a vertical synchronizing pulse inputted as a trigger signal, providing a detection circuit for generating a field detection pulse on output pulses of the multivibrators and a horizontal synchronizing pulse only at the time of odd field or even field, driving an odd gate and an even gate according to the detection pulse, thus subjecting a liquid crystal display panel to interlacing drive.

1 Claim, 6 Drawing Sheets 6a,6b : MONOSTABLE MULTIVIBRATORS

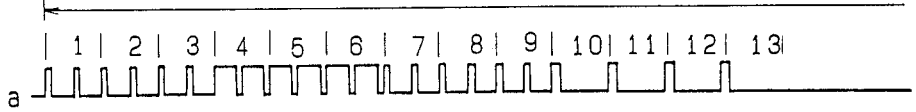
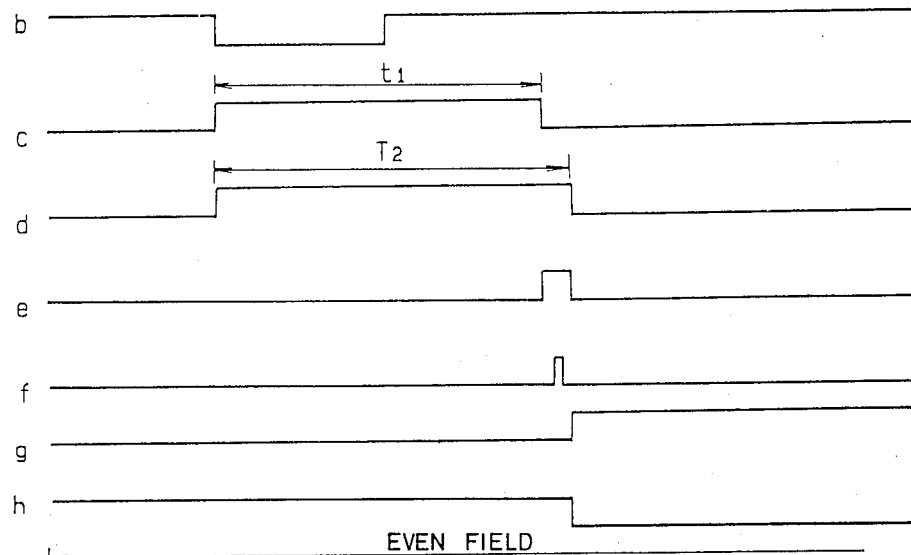
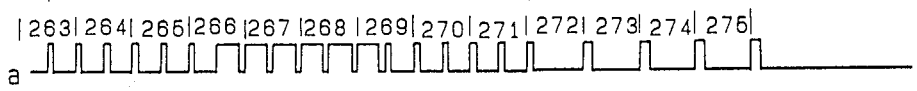
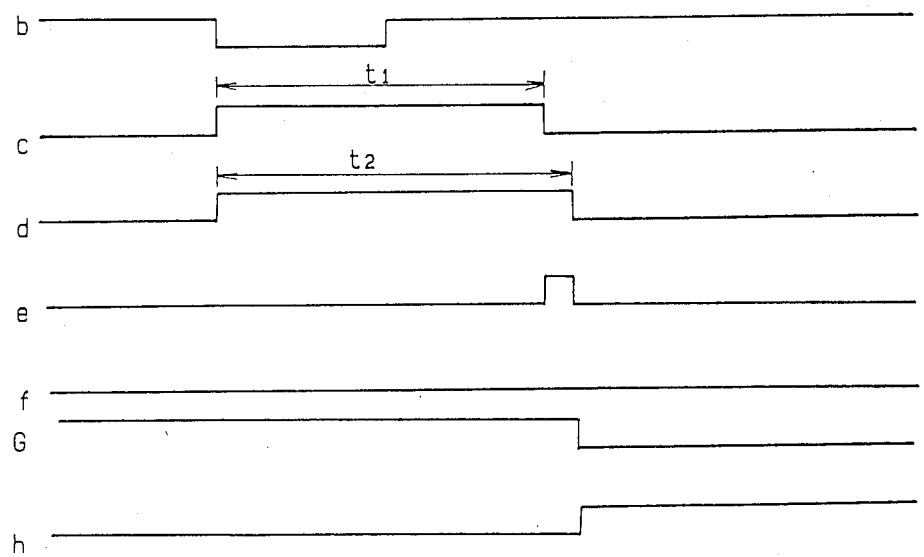

LIQUID CRYSTAL TELEVISION

BACKGROUND OF THE INVENTION

1. Field of the Invention

The present invention relates to a liquid crystal television interlacing a liquid crystal display panel of matrix drive.

2. Description of the Prior Art

In a liquid crystal TV with TFT (thin-film transistor) and LCD (liquid crystal display) combined therefor, normally gate lines of TFT are scanned in sequence by a gate driver, and a television signal (amplified to a voltage ready for driving liquid crystal) synchronized with the scanning timing is fed to a source line to TV display.

In case then the television signal is that of NTSC (National TV System Committee) color television system, 525 scanning lines are divided into odd lines (full line) and even lines (chain line) as shown in FIG. 4, and 2:1 interlacing scanning is carried out on every other line to form one picture. Accordingly, in the case of interlacing scanning system, TFT gate drivers $1a$, $1b$ are divided into two groups, one driving gate lines ($G_1$, $G_3$, ...) of odd number, while the other driving gate lines ($G_2$, $G_4$, ... of even number. Then, the aforementioned interlacing scanning is realized by driving the gate drivers $1a$, $1b$ alternately at every fields in the television signal of NTSC system, that is, at every odd field and even field.

Here, if an odd field picture and an even field picture are not positioned synchronously with each other, there takes place a vertical aberration in picture. The following refers briefly to the reason.

FIG. 6 is a waveform drawing indicating a timing of NTSC composite signal (signal combining chrominance signal, luminance signal and synchronizing signal) with each signal. In the drawing, STV, $STV_2$ denote start data signals of shift register in the foregoing gate drivers $1a$, $1b$ respectively, $CPV_1$, $CPV_2$ denote shift clocks of shift register in the gate drivers $1a$, $1b$ respectively, $CLR_1$, $CLR_2$, denote data reset signals of the gate drivers $1a$, $1b$, whereby all outputs come to a reset state at the time of "H" (high level). Then, the gate drivers $1a$, $1b$ are controlled on the data reset signals $CLR_1$, $CLR_2$, the odd gate driver $1a$ is driven when $CLR_1=$"L" (low level) and $CLR_2=$"H", the even gate driver $1b$ is then kept off in this case, and some odd field is displayed. Then in the next even field, $CLR_1=$"H" and $CLR_2=$"L", the odd gate driver $1a$ is kept off in this case, and the even gate driver $1b$ is driven. Thus, a display at every fields is given by driving the gate drivers $1a$, $1b$ of the odd gate line and the even gate line alternately, thereby subjecting LCD panel to 2:1 interlacing drive.

In this case, if the aforementioned data reset signals $CLR_1$, $CLR_2$ are generated by dividing a vertical synchronizing pulse double, then there may occur CASE 1 ($CLR_1$, $CLR_2$) and CASE 2 ($CLR_1'$, $CLR_2'$), as shown in FIG. 6. For example, if the aforementioned signals are generated on a circuit using a flip-flop 3 and an inverter 4 shown in FIG. 7, there may be a case where signals of CASE 1 and CASE 2 are generated when a power is closed or the composite signal is changed (channel selection). In CASE 1, the odd gate driver $1a$ is driven, while the even gate driver $1b$ comes off at the time of odd field timing as shown in FIG. 8, and the even gate driver $1b$ is driven, while the odd gate driver $1a$ comes off at the time of even field timing, therefore a video picture according to a transmitted video signal can be reproduced without aberration as shown in FIG. 9 (a) However, in CASE 2, the operation is reversed, and as shown in FIG. 9 (b), there arises an aberration vertically of the displayed picture. In this case, 294 line and 32 line, for example, are shifted each other at the time of horizontal bar signal as shown in FIG. 10, thus displaying an awkward picture.

The prior art liquid crystal TV is constructed as described above, and in the case of interlacing drive, a vertical synchronizing pulse is divided double, thereby obtaining a data reset signal of the gate drivers. Consequently, there occur CASE 1 and CASE 2 as described, each gate driver cannot be driven on video signals of the odd field and the even field, and thus an aberration arises inevitably in a displayed picture.

SUMMARY OF THE INVENTION

The invention has been done in view of the problem mentioned above, and its object is to provide a liquid crystal television wherein an odd gate driver and an even gate driver can be driven securely on video signals of odd field and even field respectively, and thus an aberration will never arise in a displayed picture.

The liquid crystal television according to the invention comprises providing two multivibrators different in time constant with a vertical synchronizing pulse inputted as a trigger signal, providing a detection circuit for generating a field detection pulse on output pulses of the multivibrators and a horizontal synchronizing pulse only at the time of odd field or even field, driving an odd gate and an even gate according to the detection pulse, thus subjecting a liquid crystal display panel to interlacing drive.

In the liquid crystal TV of the invention, the construction is such that an odd field or an even field is detected on outputs of two multivibrators different in time constant with a vertical synchronizing pulse inputted as a trigger signal and a horizontal synchronizing pulse, and an odd gate and an even gate are driven according to the detection pulse. Accordingly, an odd gate driver and an even gate driver can securely be driven on video signals of the odd field and the even field respectively.

DETAILED DESCRIPTION OF THE DRAWINGS

FIG. 3 is a signal waveform drawing of each point of FIG. 2;

Figure 9:
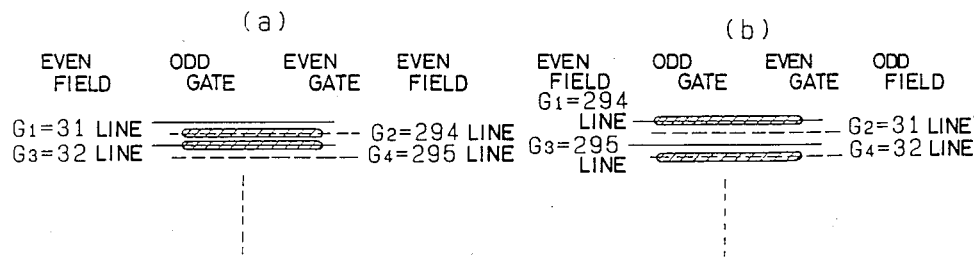
Figure 10:
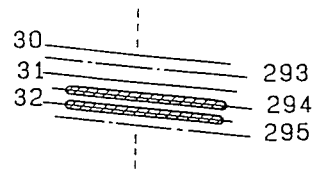
Figure 8:
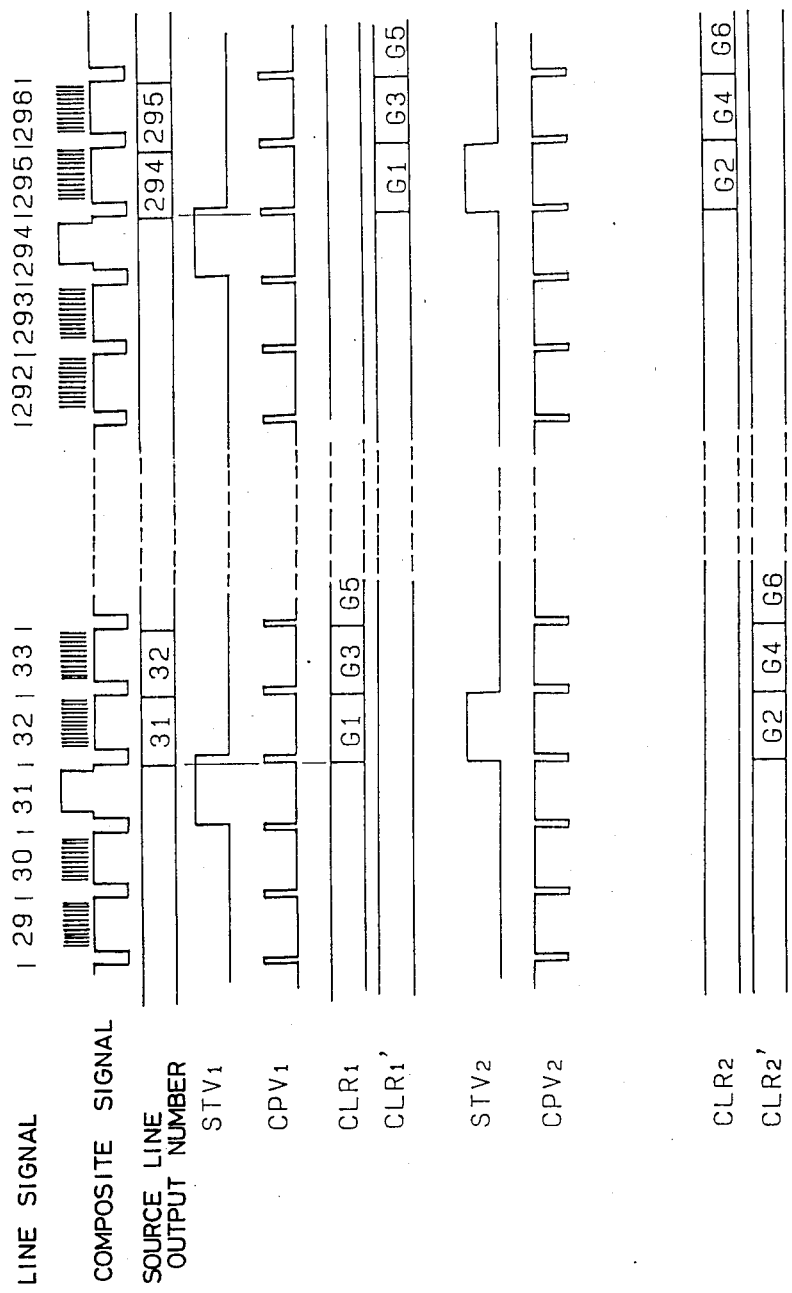
FIG. 8 is a waveform drawing for illustrating operation of each gate driver.

FIG. 9 (a), (b) are explanatory drawings showing a state of displayed pictures;

FIG. 10 is an explanatory drawing showing the case where an aberration arises in a picture.

DETAILED DESCRIPTION OF PREFERRED EMBODIMENT

Figure 1:
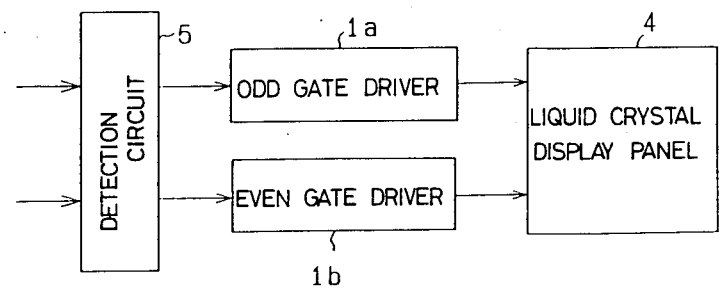
FIG. 1 is a block diagram showing a main part of a liquid crystal TV according to the invention.

One preferred embodiment of the invention will now be described with reference to the accompanying drawings. FIG. 1 is a block diagram showing a main part of a liquid crystal TV according to the invention, wherein 4 denotes LCD panel of matrix drive, which is ready for interlacing drive in an odd field and an even field divided by gate drivers 1a, 1b respectively. Then, 5 denotes a detection circuit for detecting the odd field or the even field, the field detection pulse is sent to the gate drivers 1a, 1b, and an odd gate and an even gate are driven according to the pulse sent as above.

Figure 2:
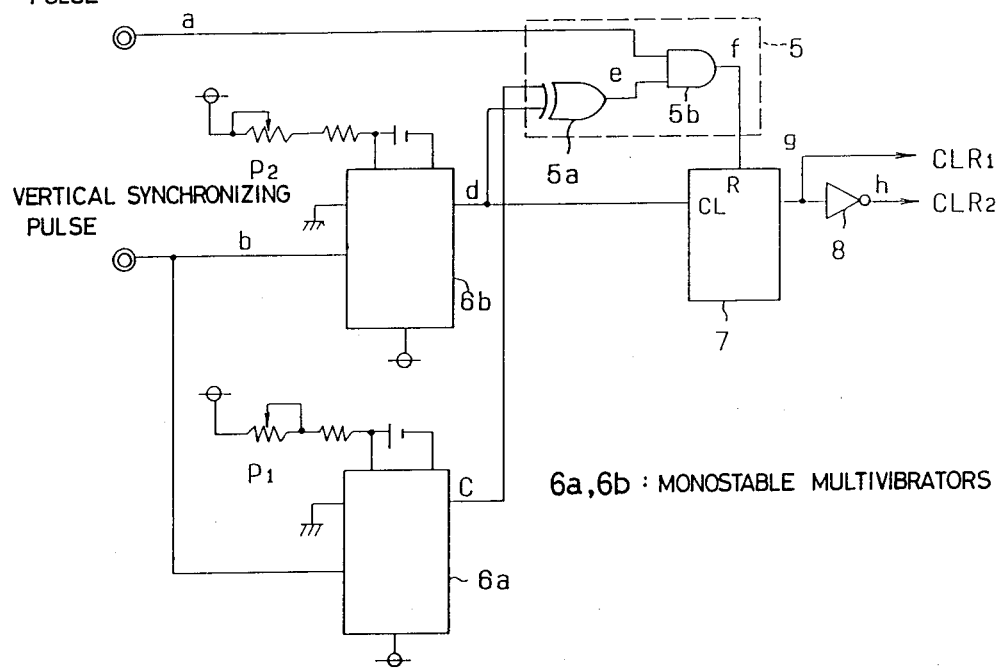
FIG. 2 is a concrete circuit diagram for field detection.
Figure 4:
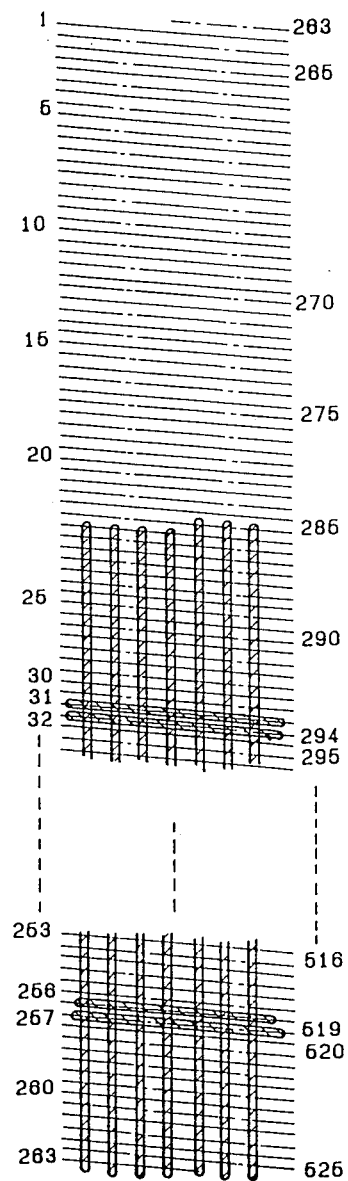
FIG. 4 is an explanatory drawing indicating interlacing scanning.
Figure 5:
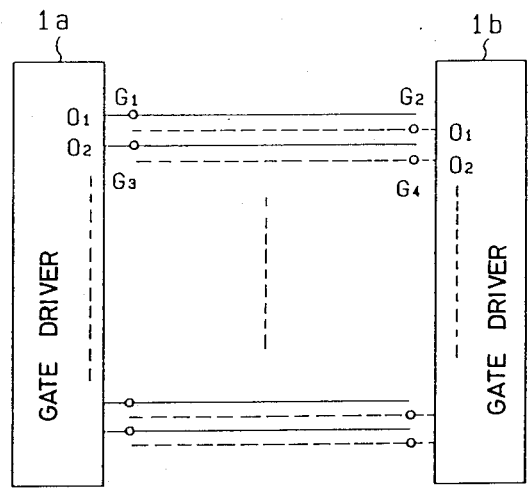
FIG. 5 is a block diagram of LCD panel in the case of interlacing drive.
Figure 6:
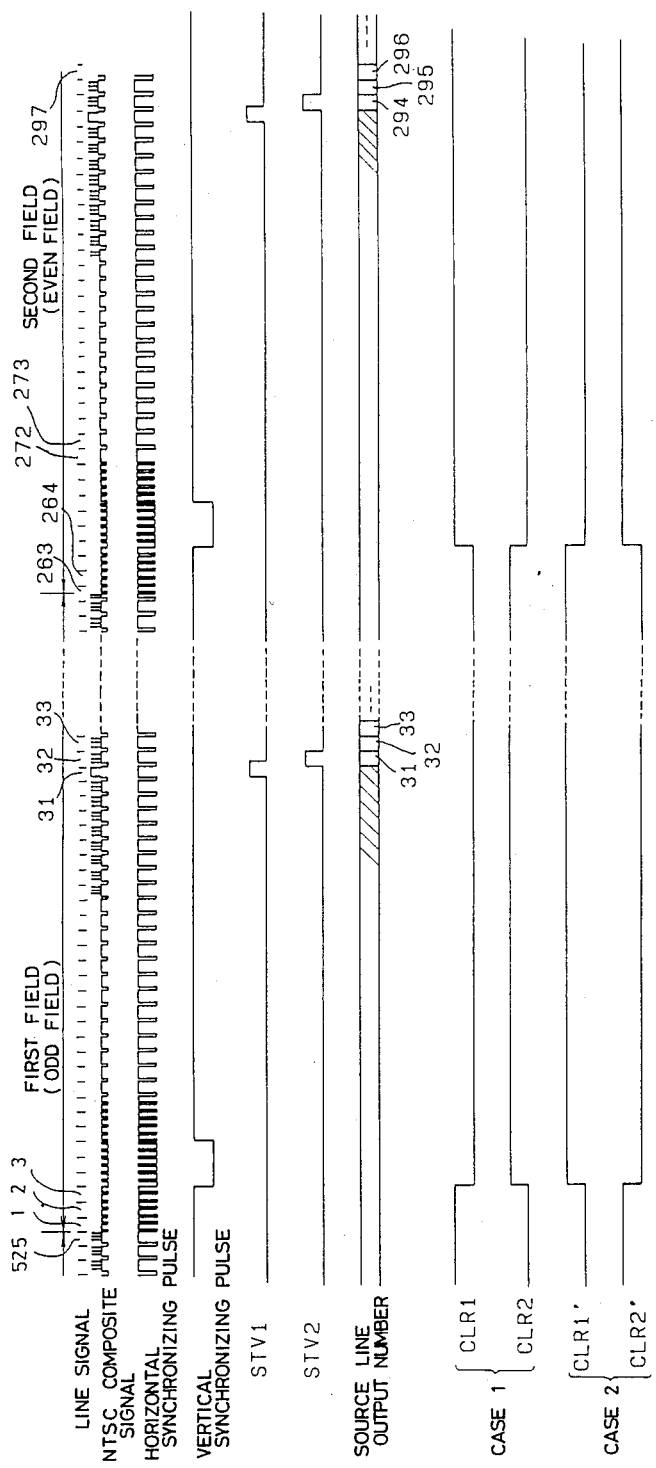
FIG. 6 is a waveform drawing showing a timing of NTSC composite signal with each signal.
Figure 7:
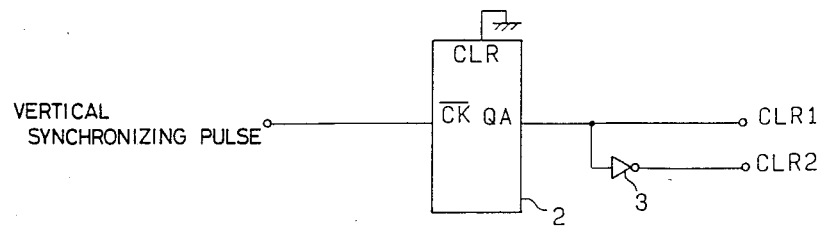
FIG. 7 is a circuit diagram for obtaining a data reset signal of gate drivers of FIG. 5.

FIG. 2 shows a concrete example of the circuit for the aforementioned field detection. The circuit comprises two monostable multivibrators 6a, 6b different in time constant with a vertical synchronizing pulse inputted as a trigger signal, and the aforementioned detection circuit 5 for generating a field detection pulse according to output pulses of the multivibrators 6a, 6b and a horizontal synchronizing pulse only at the time of odd field or even field, the detection circuit 5 comprising EX-OR gate 5a and AND gate 5b. Then, an output of the detection circuit 5, namely an output pulse of AND gate 5b is inputted to a counter 7, and an output of the counter 7 is inputted to an invertor 8.

Next, an action will be described with reference to the signal waveform drawing of FIG. 3. FIG. 3 indicates signal waveforms at points a to h of FIG. 2 separately by odd field and even field, and the case wherein the odd field is detected will be taken up for description here.

A vertical synchronizing pulse indicated by b in FIG. 3 is inputted to the two multivibrators 6a, 6b as a trigger signal, and output pulses (c, d) different in ON times ($t_1$, $t_2$) are obtained in this case by adjusting trimmers $P_1$, $P_2$ respectively. Then, outputs of the multivibrators 6a, 6b are inputted to EX-OR gate 5a, and a waveform signal indicated by e is obtainable. Here, a timing on which to generate the signal e to the horizontal synchronizing pulse a will be the point for detecting the odd field. That is, as shown in FIG. 3, it is preferable that the signal e be generated at the timing on the 10th line in the odd field, therefore the trimmers $P_1$, $P_2$ are adjusted so as to extract the horizontal synchronizing pulse on the 10th line in the odd field by AND gate 5b on the signal e, and also the trimmers $P_1$, $P_2$ are adjusted so as to generate the signal e at the timing on the 272 line likewise in the even field, then a signal f is obtainable, and one detection pulse is obtainable only at the time of odd field, thus detecting the odd field securely. Then, from inputting the detection pulse as a reset pulse for the counter 7 and also an output of the multivibrator 6b as a clock, pulses g, h are obtainable through the counter 7, and these pulses can be used as data reset signals $CLR_1$, $CLR_2$, for the aforementioned gate drivers 1a, 1b respectively.

As described, the odd field or the even field can now be detected securely, and thus the odd gate driver 1a and the even gate driver 1b are driven securely on video signals of the odd field and the even field respectively, thereby obtaining a picture distinct and easy to see.

As described above, according to the invention, since the odd field or the even field can securely be detected, the odd gate driver and the even gate driver can be driven securely on video signals of the odd field and the even field respectively, and thus an aberration will never be caused on a displayed picture.

What is claimed is:

1. In a liquid crystal television interlacing a liquid crystal display panel of matrix drive in an odd field and an even field separately, the improvement comprising two multivibrators different in time constant with a vertical synchronizing pulse inputted as a trigger signal therefor, a detection circuit for generating a field detection pulse only at the time of the odd field or the even field according to output pulses of said multivibrators and a horizontal synchronizing pulse, thus driving an odd gate of said liquid crystal display panel and an even gate according to the field detection pulse.

* * * * *